United States Patent Office 2,919,825
Patented Jan. 5, 1960

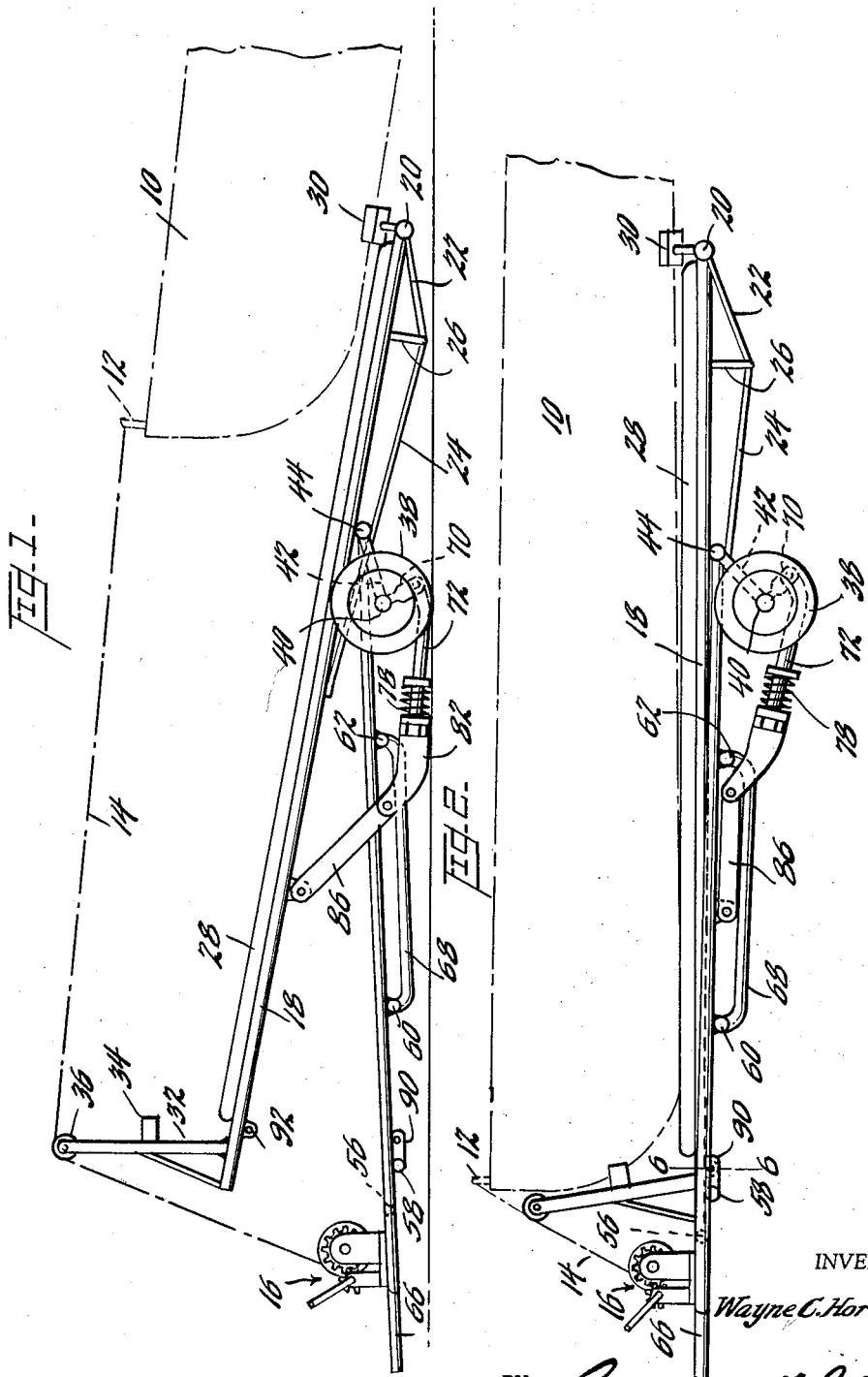

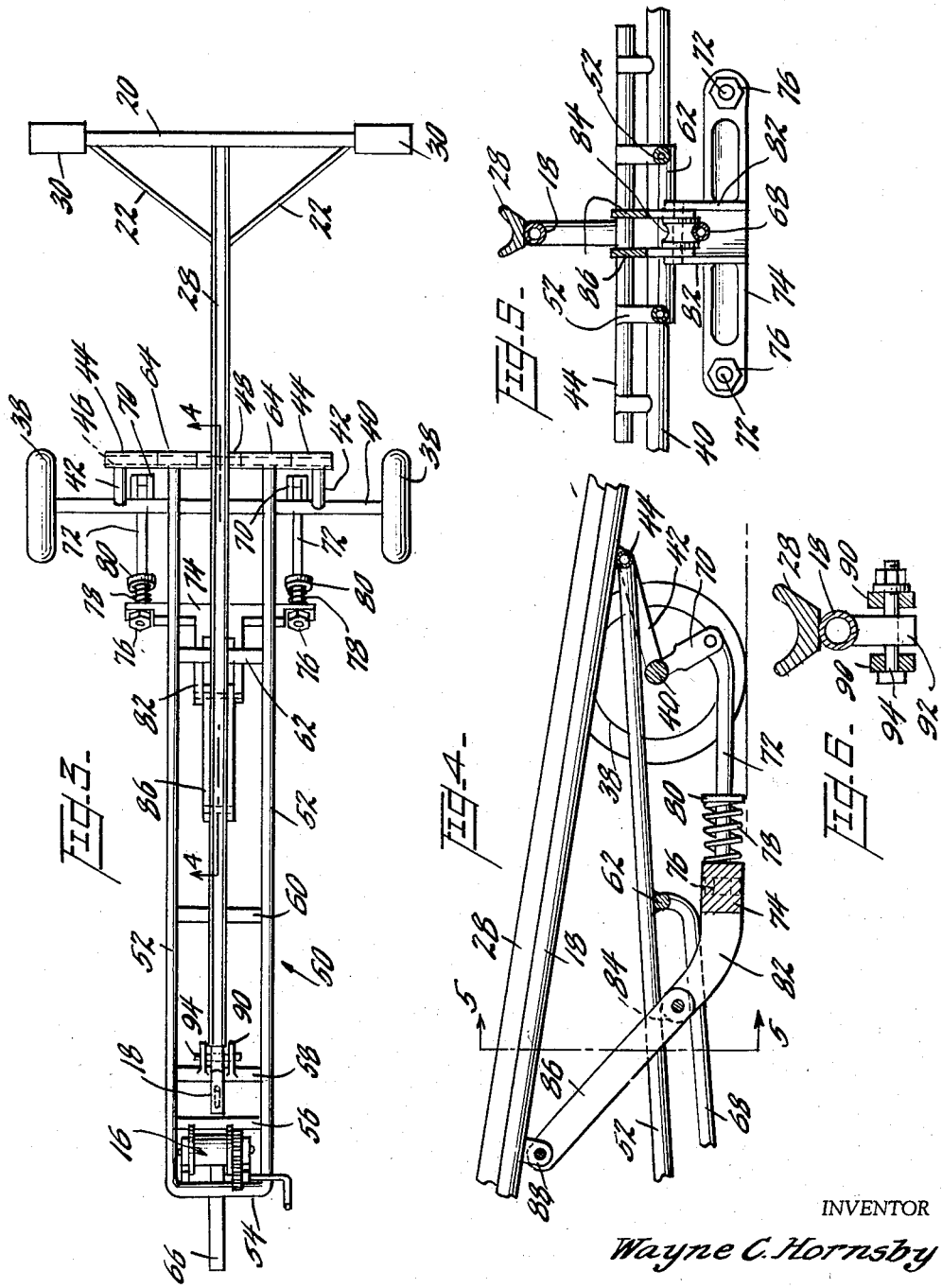

2,919,825
TWO-WHEEL CARRIAGE

Wayne C. Hornsby, Falfurrias, Tex.

Application October 22, 1957, Serial No. 691,677

12 Claims. (Cl. 214—506)

This invention relates to a two-wheel carriage, particularly suited for use as a boat trailer.

A large number of boat owners find it expedient to store their boats away from the water, transporting the boat to and from the water by means of a suitable vehicle, frequently designed for the specific purpose, especially when the boat is so large and heavy as to require the use of two persons to handle the loading and unloading. The use of a two-wheel trailer for attachment to the rear of a passenger automobile or light truck is obviously the most satisfactory arrangement of general utility. The automobile is widely available as a source of motive power besides serving to transport the users of the boat. The two-wheel trailer, besides economy of construction, may be tilted at the front to permit longitudinal discharge of the boat to the rear, for launching into the water.

For fast transportation, it is desirable that the wheels of such trailer shall be of the same general construction as the wheels of the automobile, since they are to be subjected to the same general conditions of usage. Also, for ease in repair in remote sections, it is desirable to have wheels of standard construction, readily repaired or replaced at any filling station. Such wheels are sufficiently large in diameter so that substantial difficulty may be encountered in unloading the boat. It is not practical to drop the center of the axle so that the boat will be closer to the ground when unloading. Beside the problem of scanty clearance of the axle above the road surface, there must be ample clearance on each side of the boat to prevent possible damage to the sides by the tires and, for a large boat, this would require an excessive width of tread.

The conventional high-clearance, tilting-bed trailer has such a high angle of tilt, when unloading that, without the aid of auxiliary equipment, it is necessary to back the trailer until the wheels are at the water's edge or even partially submerged. This makes traction difficult in pulling out and, in the case of salt water, results in deleterious action upon the wheel bearings by the corrosive action of the water.

I have devised a boat trailer, economically constructed, of readily procurable materials, capable of handling boats of substantial size and having a significantly lower effective angle of tilt than conventional boat trailers, whereby a boat may be much more easily loaded and unloaded and with less effort.

For a fuller understanding of my invention, reference should be had to the accompanying drawings wherein:

Figure 1 shows a side elevation of the invention in boat loading position;

Figure 2 shows a similar view in boat carrying position;

Figure 3 is a plan view of the invention with the boat removed to provide a clearer understanding of the invention;

Figure 4 is a fragmentary enlarged side elevation, partly in section, taken along the lines 4—4 of Figure 3 and showing the parts in boat unloading position;

Figure 5 is a similar figure in end elevation, taken along the line 5—5 of Figure 4; and Figure 6 is a partial section, taken along the line 6—6 of Figure 2.

Referring now to the drawings, the numeral 10 designates a boat having means 12 at the forward end thereof, for attaching a line 14 to be wound on winch 16.

In the embodiment shown, it is convenient to fabricate the major portion of the trailer frame of tubular metallic members welded to each other, unless otherwise indicated. At points where the boat comes in contact with the frame members, the frame may be padded with wood or other less galling material and, to facilitate movement of the boat, some of these points of contact may be fitted with rollers or other devices to reduce friction in movement.

The boat 10 is supported directly by main bed member 18 extending lengthwise of the trailer, having attached thereto, at the rear, a cross bed member 20. The two members are held in rigid array by means of and braced by struts 22 and 24 and post 26. It will be obvious that the particular arrangement of the bed members may be subject to variation in order to suitably conform it to the proper support points upon the boat being carried.

The bed frame member 18 carries a keel guide 28 while the ends of cross member 20 are provided with pads 30 for direct contact with the boat surface. At the forward end of the bed, there is a bumper post 32, suitably braced, carrying a bumper 34 and a pulley 36 for guiding the line 14.

The body of the trailer is supported upon wheels 38 connected to the axle 40 in any suitable manner. Extending rearwardly and upwardly from two intermediate points upon the axle 40 are a pair of arms 42, rigidly fixed to the axle. Supported upon each arm is a journal 44, the two journals accommodating shaft 46 to form an arch above and parallel to the axle 40. The bed journal 48 secured to the underside of main bed member 18 is carried on shaft 46 to enable the front end of the bed 18 to be raised for discharging the boat 10 to the rear of the trailer.

The supporting frame 50 is made up of a pair of side members 52 extending longitudinally of the structure connected by a front member 54 and a series of cross pieces 56, 58, 60, and 62, each of which serve a specific purpose to be subsequently described, in addition to adding rigidity and strength to the frame 50. At their rear ends, the side members 52 terminate in a pair of journals 64, each one located between journal 48 and one of the journals 44.

The front member 54, the cross member 56 and the forward portions of side members 52 form a network with towing shaft 66 to support winch 16 and to transmit the pull exerted by the trailer hitch upon shaft 66 to the entire remainder of the trailer.

A depending track 68 extends between the two cross braces 60 and 62.

Rigidly secured to the axle 40 and projecting rearwardly and downwardly therefrom are a pair of bell cranks 70 having yokes formed in the ends thereof for receiving, for pivotal movement therewithin the rear ends of bent links 72. The forward ends are threaded to pass through seats in the outer ends of cross head 74, where they are secured by means of nuts 76. Interposed between the cross head 74 and shoulders 80 formed on the bent links 72 are springs 78. These springs form a resilient connection between the weight carried by the trailer and the axle during the transportation of the boat and additional, they assist the unloading mechanism as will be subsequently explained. An upwardly inclined fork extension 82 of the cross head 74 terminates about the track 68. Pinned between the arms of the fork 82 are the lower ends of a pair of links 86 and a roller 84, which latter travels along the track 68. The forward end of links 86 are pivoted to a lug 88 depending from bed frame 18.

Extending rearwardly from the cross member 58 are a short pair of arms 90 forming a yoke. In registry therewith a depending lug 92 is secured to the underside of bed frame 18. Through a set of aligned holes formed in the elements 90 and 92, a bolt 94 may be passed to secure the bed frame to the trailer frame during transportation.

The operation of the device will now be described. Assuming that the boat is loaded on the trailer for towing, the line 14 will be drawn up tightly by the winch 16 and the winch will be latched into position so that no line can be payed out. The bed frame, in towing position, should tip slightly forward so that the line 14 need not be under unnecessary tension.

When it is desired to unload the boat into the water, the trailer is backed toward the water line as far as is considered expedient. The winch is unlatched and the bolt 94 withdrawn to permit separation of the bed from the trailer frame. The forward part of the bed 18 is grasped and raised by the operator. The bed frame tilts about the shaft 46 but, at the same time, the shaft 46 is also moving downwardly in an arc about the axle 40, thereby reducing the angle of incline of the bed frame. Simultaneously, the bell cranks 70 move forwardly and in turn permit the roller 84 to move forwardly on track 68. The links 86 will rise at the forward end thereof with the bed frame 86.

When loading the boat, the line 14 will be attached at 12 to the boat and the winch operated with the line 14 running over the pulley 36. Thus, the tension in the line exerts a downward thrust upon the post 36 until when the boat reaches the full forward position upon the bed 18, the winch serves to draw down the forward end of the bed. This produces thrust in the links 86 driving bell cranks 70 rearwardly and upwardly to raise the arch formed by arms 42 and shaft 46 upwardly and forwardly. When the bed reaches its lowest position at the forward part thereof, the bolt 94 may be again inserted into position.

The springs 78 assist by providing resilience within the linkage system. It is also obvious during the loading and unloading operations that one or more operators will be available to push the boat on and off the trailer, thereby assisting the operation of the mechanism but it is pointed out that the operation of the winch 16 is sufficient, without the aid of pushing, to pull the boat into place.

From the foregoing, it will be apparent that I have provided a boat trailer easily and inexpensively constructed and capable of lowering boats of substantial size into the water at an angle much less steep than has heretofore been possible.

It will be obvious that it is within the scope of my invention to rearrange the parts of my device to obtain the desired end, that is, supporting the axis about which the bed frame pivots at a high level during transport and lowering it by means of a pivoted linkage at the time the bed frame is to be tilted.

I claim:

1. A rear-loading two-wheel vehicle comprising: an axle, a pair of wheels for supporting it; a pair of arms rigidly fixed to the axle, extending upwardly and to the rear thereof, a shaft supported between the outer ends of the arms; a load-supporting bed frame supported intermediate its ends on said shaft for pivotal movement; a primary frame supported at the rear thereof on said shaft for pivotal movement and provided at the forward end with means for attachment to a draft vehicle; a track extending lengthwise of the vehicle of less length than the primary frame and supported on said frame intermediate its length; a bell crank rigidly fixed to the axle and extending downwardly and to the rear thereof; a first link pivotally connected at its forward end to a part of the bed in advance of its support position and above said track, a second link pivotally connected at its rear end to the outer end of the bell crank, the two said links being pivotally connected at their two remaining ends above said track and a track engaging member carried by said last mentioned pivotal connection whereby upward tilting of the front end of the bed with respect to the primary frame will lower the rear end thereof and also move the shaft in an arc downwardly about the axle to reduce the rearward slope of the bed.

2. The structure according to claim 1 wherein the second link includes a resiliently compressible member.

3. A rear-loading two-wheel vehicle comprising: an axle, a pair of wheels for supporting it; a pair of arms rigidly fixed to the axle, extending upwardly and to the rear thereof, a shaft supported between the outer ends of the arms; a load-supporting bed frame supported intermediate its ends on said shaft for pivotal movement; a primary frame supported at the rear thereof on said shaft for pivotal movement and provided at the forward end with means for attachment to a draft vehicle; a track extending lengthwise of the vehicle of less length than the primary frame and supported below said frame intermediate its length; a bell crank rigidly fixed to the axle and extending downwardly and to the rear thereof; a first link pivotally connected at its forward end to a part of the bed in advance of its support position and above said track, a second link pivotally connected at its rear end to the outer end of the bell crank, the two said links being pivotally connected at their two remaining ends above said track and a track engaging roller carried by said last mentioned pivotal connection whereby upward tilting of the front end of the bed with respect to the primary frame will lower the rear end thereof and also move the shaft in an arc downwardly about the axle to reduce the rearward slope of the bed.

4. A rear-loading two-wheel vehicle comprising: an axle, a pair of wheels for supporting it; a pair of arms rigidly fixed to the axle, extending upwardly and to the rear thereof, a shaft supported between the outer ends of the arms; a load-supporting bed frame supported intermediate its ends on said shaft for pivotal movement; a primary frame supported at the rear thereof on said shaft for pivotal movement and provided at the forward end with means for attachment to a draft vehicle; a bell crank rigidly fixed to the axle and extending downwardly and to the rear thereof and an upwardly bent link pivotally connected at its forward end to a part of the bed in advance of its support position and, at its rear end to the outer end of the bell crank, the two arms of said link being of unequal length, the shorter being attached to the bell crank; whereby upward tilting of the front end of the bed with respect to the primary frame will lower the rear end thereof and also move the shaft in an arc downwardly about the axle to reduce the rearward slope of the bed.

5. A rear-loading two-wheel vehicle comprising: an axle, a pair of wheels for supporting it; a pair of arms rigidly fixed to the axle, extending upwardly and to the rear thereof, a shaft supported between the outer ends of the arms; a load-supporting bed frame supported intermediate its ends on said shaft for pivotal movement; a primary frame supported at the rear thereof on said shaft for pivotal movement and provided at the forward end with means for attachment to a draft vehicle; a bell crank rigidly fixed to the axle and extending downwardly and to the rear thereof and an upwardly bent link pivotally connected at its upper end to a part of the bed in advance of its support position and, at its lower end to the outer end of the bell crank, whereby upward tilting of the front end of the bed with respect to the primary frame will lower the rear end thereof and also move the shaft in an arc downwardly about the axle to reduce the rearward slope of the bed.

6. A rear-loading two-wheel vehicle comprising: an axle, a pair of wheels for supporting it; a pair of arms rigidly fixed to the axle, extending upwardly and to the rear thereof, a shaft supported between the outer ends of the arms; a load-supporting bed frame supported intermediate its ends on said shaft for pivotal movement; a primary frame supported at the rear thereof on said shaft for pivotal movement and provided at the forward end with means for attachment to a draft vehicle; a bell crank rigidly fixed to the axle and extending downwardly and to the rear thereof, a link pivotally connected at its upper end to a part of the bed in advance of its support position and, at its lower end to the outer end of the bell crank, whereby upward tilting of the front end of the bed with respect to the primary frame will lower the rear end thereof and also move the shaft in an arc downwardly about the axle to reduce the rearward slope of the bed and a winch and line located at the forward end of said vehicle for drawing a load upon the bed from the rear thereof.

7. A rear-loading two-wheel vehicle comprising: an axle, a pair of wheels for supporting it; a pair of arms rigidly fixed to the axle, extending upwardly and to the rear thereof, a shaft supported between the outer ends of the arms; a load-supporting bed frame supported intermediate its ends on said shaft for pivotal movement; a primary frame supported at the rear thereof on said shaft for pivotal movement and provided at the forward end with means for attachment to a draft vehicle; a bell crank rigidly fixed to the axle and extending downwardly and to the rear thereof, a link pivotally connected at its upper end to a part of the bed in advance of its support position and, at its lower end to the outer end of the bell crank, whereby upward tilting of the front end of the bed with respect to the primary frame will lower the rear end thereof and also move the shaft in an arc downwardly about the axle to reduce the rearward slope of the bed, a winch and line located at the forward end of said vehicle for drawing a load upon the bed from the rear thereof, an elevated post positioned immediately to the rear of said winch and a pulley at the top of said post for training said line thereover.

8. The structure of claim 7 including a cushioned bumper located on the rear side of the post for limiting the load against further forward movement.

9. The structure of claim 7 wherein the winch is located upon the primary frame and the post upon the bed frame whereby the tension in the line will exert a downward thrust upon the post as it passes over the pulley.

10. A rear-loading two-wheel vehicle comprising: an axle, a pair of wheels for supporting it; a pair of arms rigidly fixed to the axle, extending upwardly and to the rear thereof, a shaft supported between the outer ends of the arms; a load-supporting bed frame supported intermediate its ends on said shaft for pivotal movement; a primary frame supported at the rear thereof on said shaft for pivotal movement and provided at the forward end with means for attachment to a draft vehicle; a bell crank rigidly fixed to the axle and extending downwardly and to the rear thereof and a link pivotally connected at its upper end to a part of the bed in advance of its support position and, at its lower end to the outer end of the bell crank, whereby upward tilting of the front end of the bed with respect to the primary frame will lower the rear end thereof and also move the shaft in an arc downwardly about the axle to reduce the rearward slope of the bed.

11. A rear-loading two-wheel vehicle comprising: an axle, a pair of wheels for supporting it; a pair of arms rigidly fixed to the axle, extending upwardly thereof, a shaft supported between the outer ends of the arms; a load-supporting bed frame supported intermediate its ends on said shaft for pivotal movement; a primary frame supported at the rear thereof on said shaft for pivotal movement and provided at the forward end with means for attachment to a draft vehicle; a bell crank rigidly fixed to the axle and extending downwardly and at an acute angle to the arms fixed to the axle and a link pivotally connected at its upper end to a part of the bed in advance of its support position and, at its lower end to the outer end of the bell crank, whereby upward tilting of the front end of the bed with respect to the primary frame will lower the rear end thereof and also move the shaft in an arc downwardly about the axle to reduce the rearward slope of the bed.

12. A rear-loading two-wheel vehicle comprising: an axle, a pair of wheels for supporting it; a pair of arms rigidly fixed to the axle, extending upwardly and to the rear thereof, a shaft supported between the outer ends of the arms; a load-supporting bed frame supported intermediate its ends on said shaft for pivotal movement; a primary frame supported at the rear thereof on said shaft for pivotal movement and provided at the forward end with means for attachment to a draft vehicle; means at their respective forward ends for detachably securing the bed frame to the forward frame, a bell crank rigidly fixed to the axle and extending downwardly and to the rear thereof and a link pivotally connected at its upper end to a part of the bed in advance of its support position and, at its lower end to the outer end of the bell crank, whereby upward tilting of the front end of the bed with respect to the primary frame will lower the rear end thereof and also move the shaft in an arc downwardly about the axle to reduce the rearward slope of the bed.

References Cited in the file of this patent

UNITED STATES PATENTS

| | | |
|---|---|---|
| 2,506,699 | Byrd | May 9, 1950 |
| 2,624,484 | Dalton | Jan. 6, 1953 |
| 2,650,730 | Rohm | Sept. 1, 1953 |
| 2,805,786 | Green | Sept. 10, 1957 |